United States Patent [19]

Boehmke et al.

[11] 4,246,172
[45] Jan. 20, 1981

[54] CATIONIC DYESTUFFS ORGANOPHOSPHONIC ACID SALTS OF QUATERNARY AMMONIUM ALKYLENE AMINO AZO DYES

[75] Inventors: Günther Boehmke, Leverkusen; Udo-Winfried Hendricks, Cologne, both in Fed. Rep. of Germany

[73] Assignee: Bayer Aktiengesellschaft, Leverkusen, Fed. Rep. of Germany

[21] Appl. No.: 707,497

[22] Filed: Jul. 22, 1976

[30] Foreign Application Priority Data

Jul. 25, 1975 [DE] Fed. Rep. of Germany ....... 2533428

[51] Int. Cl.³ .................. C09B 29/08; C09B 29/26; C09B 29/36; D06P 1/41
[52] U.S. Cl. .................................. 260/205; 260/152; 260/156; 260/158; 260/163; 260/165; 260/206; 260/207; 260/207.1; 260/378; 260/381
[58] Field of Search ............ 260/205, 206, 207, 207.1, 260/152, 156, 158, 162, 163, 165

[56] References Cited

U.S. PATENT DOCUMENTS 2,972,508  2/1961  Kruckenberg et al. ......... 260/205 X
3,148,181  9/1964  Wallace et al. ..................... 260/207

*Primary Examiner*—Floyd D. Higel
*Attorney, Agent, or Firm*—Sprung, Felfe, Horn, Lynch & Kramer

[57] ABSTRACT

Cationic dyestuffs of the formula

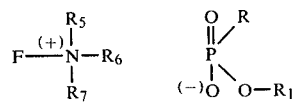

wherein
 F denotes the radical of a dyestuff,
 R denotes hydrogen or optionally substituted alkyl with 1–4 carbon atoms,
 $R_1$ denotes alkyl with 1–4 carbon atoms,
 $R_5$ and $R_6$ denote optionally substituted alkyl, alkenyl or aralkyl or conjointly form the remainder of a heterocyclic ring, and
 $R_7$ denotes alkyl with 1–4 carbon atoms, are especially suitable for dyeing textiles of polyacrylonitrile and acid modified polyesters and polyamides.

7 Claims, No Drawings

CATIONIC DYESTUFFS ORGANOPHOSPHONIC ACID SALTS OF QUATERNARY AMMONIUM ALKYLENE AMINO AZO DYES

The invention relates to cationic dyestuffs of the general formula

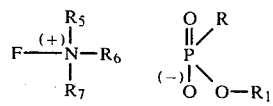

wherein
- F denotes the radical of a dyestuff,
- R denotes hydrogen or alkyl with 1–4 carbon atoms, which can be substituted by hydroxyl, cyano or alkylcarbonyloxy or alkoxycarbonyl with, in each case, 1–4 carbon atoms in the alkyl chain,
- $R_1$ denotes alkyl with 1–4 carbon atoms and
- $R_5$ and $R_6$ denote optionally substituted alkyl, alkenyl or aralkyl or conjointly form the remainder of a heterocyclic ring, and
- $R_7$ denotes alkyl with 1–4 carbon atoms.

The invention also relates to the preparation of these dyestuffs, their use for dyeing natural and synthetic materials, their solutions in water and organic solvents and the preparation of these solutions.

The dyestuffs belong, in particular, to the group of azo dyestuffs and anthraquinone dyestuffs.

Preferred azo dyestuffs have the formula

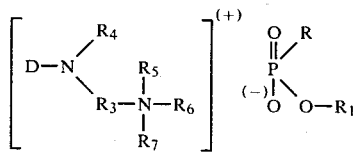

wherein
- D denotes the radical of an azo dyestuff which is free from sulphonic acid groups,
- $R_3$ denotes an alkylene radical and
- $R_4$ denotes hydrogen or optionally substituted alkyl, or
- $R_4$ and $R_5$ conjointly can form the remainder of a heterocyclic ring and
- R, $R_1$, $R_5$, $R_6$ and $R_7$ have the abovementioned meaning.

Amongst these dyestuffs, those of the formula

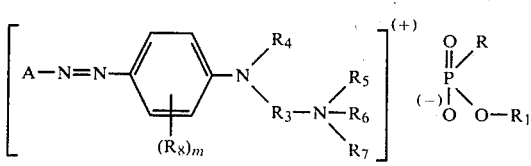

wherein
- A denotes the radical of an aromatic-carbocyclic or aromatic-heterocyclic diazo component,
- $R_8$ denotes halogen, alkyl, alkoxy, aryloxy, acyl or acylamino,
- m denotes 0, 1, 2, 3 or 4 and
- the radical R to $R_7$ have the abovementioned meaning, are to be singled out.

Amongst these dyestuffs, those in which the diazo component A represents a radical of the benzene, thiazole, benzthiazole, benzisothiazole or thiadiazole series are to be singled out.

Suitable alkyl radicals $R_4$, $R_5$, $R_6$ and $R_8$ are preferably those with 1–6 C atoms. They can be substituted, for example, by halogen, cyano, hydroxyl, $C_1$–$C_4$-alkoxy, $C_1$–$C_4$-alkoxycarbonyl or $C_1$–$C_4$-alkylcarbonyloxy.

Suitable alkylene radicals $R_3$ are, for example, straight-chain and branched radicals with 2–5 C atoms.

Suitable alkenyl radicals $R_5$ and $R_6$ preferably have 2–4 C atoms.

Suitable aryloxy radicals $R_8$ are, in particular, the phenyloxy radical and the naphthyloxy radical and their derivatives which are substituted by halogen, nitro, $C_1$–$C_4$-alkyl or $C_1$–$C_4$-alkoxy.

Suitable aralkyl radicals $R_5$ and $R_6$ are preferably the benzyl radical and the 2-phenylethyl radical and their derivatives which are substituted in the ring by halogen, nitro, $C_1$–$C_4$-alkyl or $C_1$–$C_4$-alkoxy.

Suitable acyl radicals $R_8$ are, in particular, alkylcarbonyl and alkylsulphonyl radicals with 1–4 C atoms in the alkyl radical, or benzoyl. $R_7$ preferably represents methyl or ethyl.

The substituents $R_4$ and $R_5$ conjointly form, in particular, the radical of a 5-membered or 6-membered ring, for example of a piperazine ring, which can be substituted by alkyl groups with 1–4 C atoms.

The substituents $R_5$ and $R_6$ conjointly form, in particular, the radical of a 5-membered or 6-membered ring, for example of a piperidine or morpholine ring, which can be substituted by alkyl groups with 1–4 C atoms.

Halogen is understood as preferably fluorine, chlorine or bromine.

Dyestuffs of the formulae

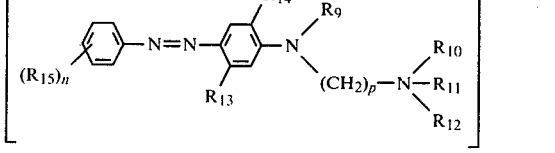

wherein
- $R_9$ to $R_{12}$ denote $C_1$–$C_4$-alkyl,
- $R_{13}$ and $R_{14}$ denote hydrogen, $C_1$–$C_4$-alkyl or $C_1$–$C_4$-alkoxy and
- $R_{13}$ also denotes $C_1$–$C_3$-alkylcarbonyl or $C_1$–$C_3$-alkylsulphonylamino,
- $R_{15}$ denotes $C_1$–$C_4$-alkyl, halogen, cyano, nitro, $C_1$–$C_4$-alkoxycarbonyl, $C_1$–$C_4$-alkylcarbonyloxy, $C_1$–$C_4$-alkylcarbonyl or optionally $C_1$–$C_4$-monoalkylated or -dialkylated aminosulphonyl or aminocarbonyl,
- n denotes 1 to 5 and
- p denotes 2 or 3, and $$\left[ A_1-N=N-\underset{R_{13}}{\overset{R_{14}}{\underset{\|}{\bigcirc}}}-\underset{R_9}{N}-(CH_2)_p-\underset{R_{12}}{\overset{R_{10}}{\underset{\|}{N}-R_{11}}} \right]^{(+)} \quad \underset{(-)O}{\overset{O}{\underset{\|}{P}}}\underset{OR_1}{\overset{R}{}} \quad V$$

wherein
$A_1$ represents radicals of the formulae $(R_{16})_q\!\!-\!\!\overset{N}{\underset{S}{\bigcirc}}\!\!\!\!\!\!\!\!-\quad (R_{17})_q\!\!-\!\!\overset{N}{\underset{S}{\bigcirc}}\!\!\!\!\!\!\!\!-$ $(R_{17})_q\!\!-\!\!\overset{N}{\underset{\underset{S}{\|}}{\bigcirc}}\!\!\!\!\!\!\!\!-\quad \underset{R_{18}}{\overset{N-\!\!-\!\!N}{\underset{S}{\bigcirc}}}\!\!\!\!\!\!\!\!-$ and $\underset{N}{\overset{R_{18}}{\underset{S}{\bigcirc}}}\!\!\!\!\!\!\!\!-$ in which
$R_{16}$ denotes $C_1$-$C_4$-alkyl, phenyl, cyano, nitro or $C_1$-$C_4$-alkoxycarbonyl,
$R_{17}$ denotes $C_1$-$C_4$-alkyl, $C_1$-$C_4$-alkoxy, phenoxy, nitro,
$C_1$-$C_4$-alkylcarbonyloxy or halogen,
$R_{18}$ denotes hydrogen, $C_1$-$C_4$-alkyl, $C_1$-$C_4$-alkoxy, phenoxy, cyclohexyl, phenyl, phenyl which is substituted by $C_1$-$C_4$-alkyl, $C_1$-$C_4$-alkoxy, nitro, halogen or acetylamino, benzyl, methyl-, ethyl- or phenylmercapto, benzylmercapto, dimethylamino or diethylamino or methyl-, ethyl- or phenyl-sulphonyl, and
q denotes 0, 1 or 2, and
wherein
R and $R_1$ have the abovementioned meaning, are particularly preferred.

Amongst these dyestuffs those in which n denotes 1–3 and q denotes 0 or 1 are preferred.

Examples of cations of the azo dyestuffs of the formula II are described in British Pat. Nos. 1,134,579, 1,154,006, 1,336,614 and 1,342,380, in Belgian Pat. No. 724,988, in French Pat. No. 1,403,396 and in U.S. Pat. No. 2,099,525, 2,972,508 and 3,417,076.

Further preferred azo dyestuffs of the formula I are those of the formula $$\left[ \underset{R_7}{\overset{R_5}{\underset{\|}{R_6-N-Y}}}-\bigcirc-N=N-A \right]^{(+)} \quad \underset{(-)O}{\overset{O}{\underset{\|}{P}}}\underset{O-R_1}{\overset{R}{}} \quad VI$$

wherein
the benzene ring can be substituted by non-ionic radicals, especially chlorine or nitro,
Y denotes a direct bond or —$CH_2$—CO— and
A denotes a coupling component of the benzene, naphthalene, indole, pyrazolone or aminopyrazole series and
the radicals R, $R_1$, $R_5$, $R_6$ and $R_7$ have the abovementioned meaning.
Amongst these dyestuffs, those of the formula $$\left[ \underset{R_{12}}{\overset{R_{10}}{\underset{\|}{R_{11}-N-Y}}}-\underset{X}{\bigcirc}-N=N-\underset{X}{\bigcirc}-\underset{R_{20}}{\overset{R_{19}}{N}} \right]^{(+)} \quad \underset{(-)O}{\overset{O}{\underset{\|}{P}}}\underset{O-R_1}{\overset{R}{}} \quad VII$$

wherein
X denotes hydrogen or halogen and
$R_{19}$ and $R_{20}$ denote hydrogen or $C_1$-$C_4$-alkyl which is optionally substituted by hydroxyl or cyano, and
the radicals Y, R, $R_1$ and $R_{10}$ to $R_{12}$ have the abovementioned meaning, are to be singled out.
Examples of cations of the azo dyestuffs are described in U.S. Pat. Nos. 2,821,528, 3,020,272, 3,532,683, 3,759,893 and 3,876,627.
Also to be singled out are azo dyestuffs of the formula $$\left[ A-N=N-\underset{HO}{\overset{T_1}{\underset{N}{\bigcirc}}}\underset{T}{\overset{T_2}{=O}} \right]^{(+)} \quad \underset{(-)O}{\overset{O}{\underset{\|}{P}}}\underset{O-R_1}{\overset{R}{}} \quad VIII$$

wherein
T denotes hydrogen, $C_1$-$C_4$-alkyl which is optionally substituted by $$(+)-\underset{R_7}{\overset{R_5}{\underset{\|}{N-R_6,}}}$$

or benzyl,
$T_1$ denotes hydrogen, hydroxyl or $C_1$-$C_4$-alkyl and
$T_2$ denotes hydrogen, cyano, $C_1$-$C_4$-alkoxycarbonyl, $C_1$-$C_4$-alkyl-aminocarbonyl, aminocarbonyl or $C_1$-$C_4$-alkyl, and
A, R and $R_1$ have the abovementioned meaning, and wherein either T or A is substituted by

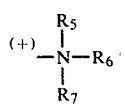

Amongst these dyestuffs, those to be mentioned in particular are those in which
T represents the radical

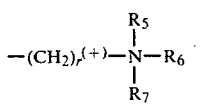

r represents 2–4,
$T_1$ represents hydroxyl or $C_1$–$C_4$-alkyl,
$T_2$ represents cyano, aminocarbonyl, methoxycarbonyl or ethoxycarbonyl and
A represents a phenyl radical which is optionally substituted by halogen, $C_1$–$C_4$-alkoxy, phenoxy, cyano, nitro or $C_1$–$C_4$-alkylsulphonyl.

Examples of cations of these dyestuffs are described in German Offenlegungsschriften (German Published Specifications) Nos. 2,263,109 and 2,315,637 and in British Patent Specification 1,297,116.

Preferred anthraquinone dyestuffs of the formula I are those of the formula

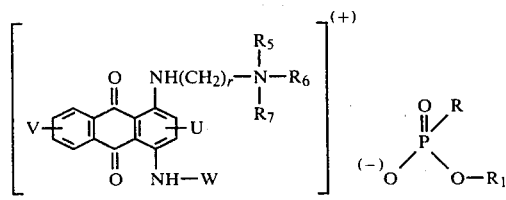

wherein
U represents hydrogen, halogen or cyano,
V represents one or two substituents and denotes hydrogen, amino or nitro,
W represents hydrogen, $C_1$–$C_4$-alkyl, optionally halogen-substituted or $C_1$–$C_4$-alkyl-substituted phenyl, naphthyl or benzyl or represents the radical

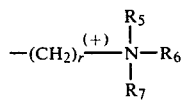

and wherein
r, R, $R_1$, $R_5$, $R_6$ and $R_7$ have the abovementioned meaning.

Examples of cations of the anthraquinone dyestuffs of the formula IX are described in German Offenlegungsschriften (German Published Specifications) Nos. 2,023,632 and 2,129,385, in German Pat. No. 1,150,652 and in French Pat. Nos. 1,459,493, 1,563,068 and 2,086,050.

Compared with the cationic azo dyestuffs described in these patent specifications, the new dyestuffs are distinguished by an improved solubility in water and in polar organic solvents.

The dyestuffs of the formula (I) are prepared by reacting dye bases of the formula

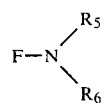

with phosphites or phosphonates of the formula

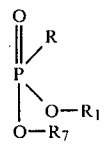

wherein the symbols have the abovementioned meaning.

Examples of preferred compounds (XI) are: dimethyl phosphite, diethyl phosphite, dimethyl methanephosphonate, diethyl methanephosphonate, methyl ethyl methanephosphonate, methyl propyl methanephosphonate, methyl butyl methanephosphonate, methyl hexyl methanephosphonate, methyl octyl methanephosphonate, methyl decyl methanephosphonate, methyl dodecyl methanephosphonate, dimethyl β-hydroxyethanephosphonate, dimethyl β-acetoxyethanephosphonate, dimethyl β-methoxycarbonylethanephosphonate and dimethyl β-cyanoethanephosphonate.

The compounds (XI) are preferably employed in an amount of 1–1.5 mols per mol of dye base.

The reaction is carried out in water and/or organic solvents, such as methanol, ethanol, propanol, isopropanol, butanol, glycol, glycol methyl ether, glycol dimethyl ether, glycol butyl ether, diglycol methyl ether, methyl ethyl ketone, methyl butyl ketone, dimethylformamide, sulpholane, hydroxypropionitrile, toluene, xylene, benzyl alcohol, phenoxyethanol, benzyloxypropionitrile, monoacetin or diacetin, preferably at 70°–120° C.

A preferred form of the preparation is the alkylation of the dyestuff bases in water and/or alcohols or glycols.

A particular advantage of this process is that ready-to-use, concentrated stable solutions are obtained without isolation of the dyestuff.

Dyestuff solutions with concentrations of up to 50%, preferably of 10%–40%, can be obtained.

Concentrated solutions of cationic dyestuffs have hitherto been prepared by isolating the dyestuffs after they have been prepared and, after the anion introduced during the preparation has, if necessary, been exchanged for another anion, dissolving them in an organic solvent, if appropriate in the presence of acids.

Compared with these processes, the new process is thus distinguished by the fact that several reaction steps can be combined in one stage.

The new solutions are stable on storage, even at low temperatures.

The new dyestuffs are suitable for dyeing, printing and bulk dyeing the substrates which it is known to be possible to dye with cationic dyestuffs, especially for dyeing polyacrylonitrile and acid-modified polyesters and polyamides.

EXAMPLE 1

37 g of the dyestuff

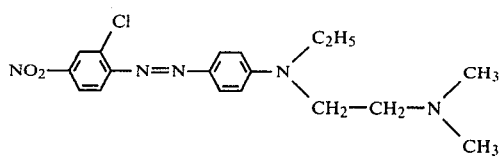

are dissolved in 200 g of toluene at 80°–90° C. and 15 g of dimethyl phosphite are added. The mixture is heated to 100°–110° C. for 7–8 hours. Some of the quaternised dyestuff crystallises out during the reaction. The toluene is then distilled off in vacuo at 70° C. The crystalline red dyestuff

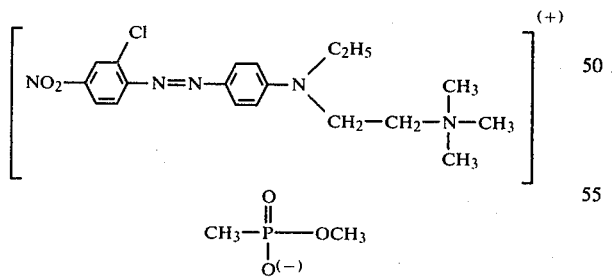

remains as a residue in an amount of 54 g and displays outstanding solubility in water, alcohols and glycols. 10 g of this dyestuff dissolve in 100 g of water at 22° C.

The chloride of the dyestuff has a solubility of about

The dyestuff dyes polyacrylonitrile fibres in an opaque red shade.

EXAMPLE 2

37 g of the starting dyestuff of Example 1 are dissolved in 200 g of toluene at 80°–90° C. For quaternisation, 17 g of dimethyl methanephosphonate are added and the mixture is heated to 100°–110° for 1 hour. 10 g of water are then fed in and the mixture is heated to 100°–105° C. for a further 6 hours. After cooling, the quaternised dyestuff can be filtered off from the solution by means of a suction filter. 25 g are isolated. A further 28 g can be obtained by evaorating the filtrate in vacuo.

The red dyestuff

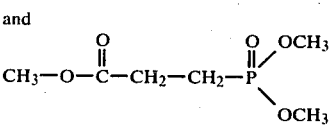

dissolves in an amount of 10 g in 100 g of water at 20° C. without the temperature having to be raised to achieve solution.

30% strength solutions of the dyestuff in glycol/water mixtures are stable liquid formulations which are ready for marketing.

The dyestuff employed in Example 1 can also advantageously be reacted with the following quaternising agents:

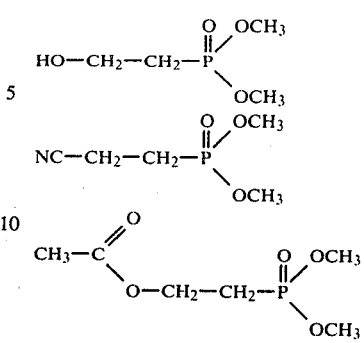

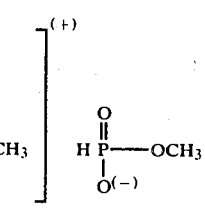

and

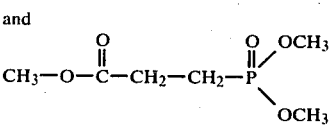

EXAMPLE 3

40 g of the dyestuff

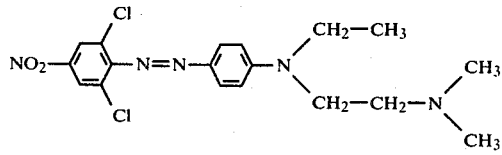

together with 20 g of dimethyl β-cyanoethylphosphonate in 30 g of ethylene glycol and 13 g of water are heated to 90°–95° C. for 5 hours.

The quaternized dyestuff

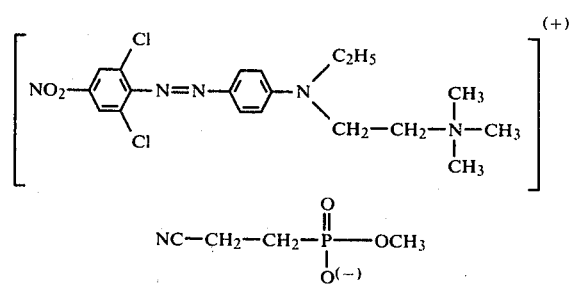

remains stable on storage in this solution at room temperature and can be used direct for dyeing polyacrylonitrile in a yellowish-brown shade.

EXAMPLE 4

38 g of the dyestuff

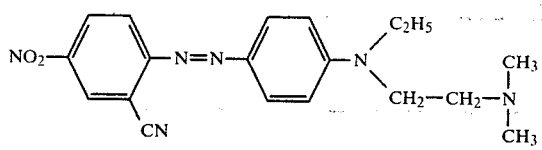

are dissolved in 200 g of toluene at 80° C. and 15 g of dimethyl phosphite are added. The mixture is stirred for 7 hours at 100°–105° C. and the toluene is then distilled off in vacuo at 70° C.

In contrast to the hydrochloride, the quaternised dyestuff

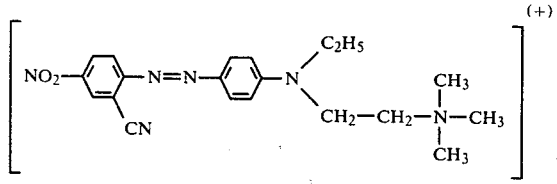

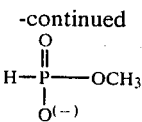

dissolves very readily in water and polar organic solvents, so that even highly concentrated solutions which are stable on storage can be prepared.

Polyacrylonitrile materials are dyed in a clear red shade.

The dyestuffs, of the formula

in the tables which follow, can also be prepared by the processes of Examples 1–4.

| A | B(+) | An(−) | Colour shade on polyacrylonitrile |
|---|---|---|---|
| NO₂–C₆H₃(Cl)– | –C₆H₄–N(CH₃)(CH₂–CH₂–N(CH₃)(CH₂–CH₂)₂O) | H–P(=O)(OCH₃)(O⁻) | red |
| NO₂–C₆H₃(Cl)– | –C₆H₃(CH₃)–N(CH₃)(CH₂–CH₂–N⁺(CH₃)₃) | " | red |
| NO₂–C₆H₃(Cl)– | –C₆H₃(CH₃)–N(C₄H₉)(CH₂–CH₂–N⁺(CH₃)₃) | " | red |
| NO₂–C₆H₃(Cl)– | –C₆H₄–N(C₂H₅–CN)(CH₂–CH₂–N⁺(CH₃)₃) | " | red |
| NO₂–C₆H₃(Cl)– | –C₆H₃(CH₃)–N(C₂H₅)(CH₂–CH₂–CH₂–N⁺(CH₃)₃) | CH₃–P(=O)(OCH₃)(O⁻) | red |
| NO₂–C₆H₂(Cl)(Cl)– | –C₆H₄–N(C₂H₅)(CH₂–CH₂–N⁺(C₄H₉)(CH₃)(C₄H₉)) | " | yellow-brown |

-continued

| A | B(+) | An(−) | Colour shade on polyacrylonitrile |
|---|---|---|---|
| 2,4-Cl₂-5-NO₂-C₆H₂- | 4-CH₃-C₆H₃-N(C₂H₅)-CH₂-CH₂-N⁺(CH₃)₃ | " | brown |
| 2,4-Cl₂-5-NO₂-C₆H₂- | C₆H₄-N(C₂H₅)-CH₂-CH₂-N⁺(CH₃)(CH₃)-CH₂-CH₂-CN | " | yellow-brown |
| 2-CN-4-NO₂-C₆H₃- | C₆H₄-N(C₄H₉)-CH₂-CH₂-N⁺(CH₃)(CH₃)-CH₂-CH₃ | H-P(=O)(OC₂H₅)(O⁻) | bluish-tinged red |
| 2-CN-4-NO₂-C₆H₃- | C₆H₄-N(CH₂CH₂OCH₃)-CH₂-CH₂-N⁺(CH₃)(CH₃)-CH₂-CH₃ | " | bluish-tinged red |
| 2-CN-4-NO₂-C₆H₃- | 3-CH₃-C₆H₃-N(CH₂CH₂-O-C₄H₉)-CH₂-CH₂-N⁺(CH₃)(CH₃)-CH₂-CH₃ | " | bluish-tinged red |
| 2,4-Cl₂-C₆H₃- | C₆H₄-N(CH₂-CH₃)-CH₂-CH₂-N⁺(CH₃)₃ | CH₃-P(=O)(OCH₃)(O⁻) | yellow |
| 2,5-Cl₂-C₆H₃- | 2,5-(OCH₃)₂-C₆H₂-N(CH₂CH₃)-CH₂-CH₂-N⁺(CH₃)(CH₃)-CH₂CH₂CH₂OCH₃ | " | yellow |
| 2,4-Cl₂-C₆H₃- | C₆H₄-N(CH₂-CH₃)-CH₂-CH₂-N⁺(CH₃)(morpholinyl) | " | yellow |
| 4-Br-C₆H₄- | C₆H₄-N(CH₂-CH₃)-CH₂-CH₂-N⁺(CH₃)(morpholinyl) | H-P(=O)(OCH₃)(O⁻) | yellow |
| 2,4-(NO₂)₂-C₆H₃- | C₆H₄-N(C₂H₅)-CH₂-CH₂-N⁺(CH₃)₃ | " | violet |

-continued
| A | B(+) | An(−) | Colour shade on polyacrylonitrile |
|---|---|---|---|
| 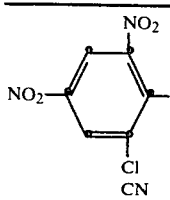 | 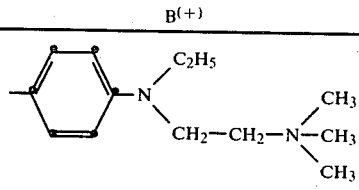 | 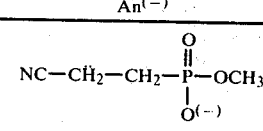 | violet |
| 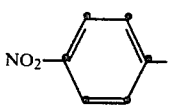 | 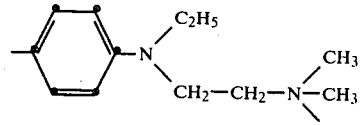 | 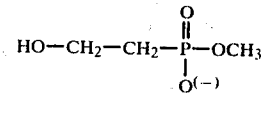 | violet |
| 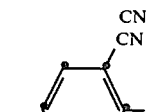 | 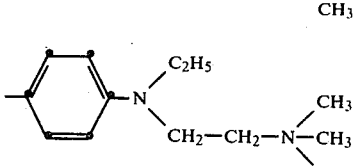 | " | orange |
| 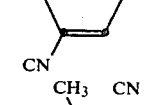 | 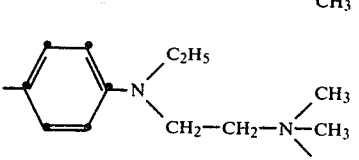 | " | red |
| 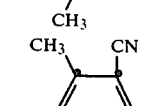 | 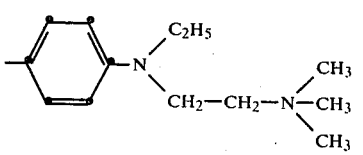 | 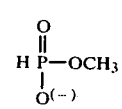 | red |
| 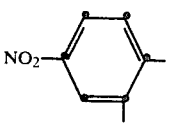 | 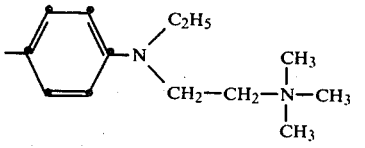 | " | red |
| 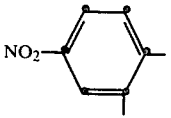 | 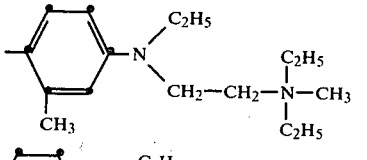 | " | red |
| 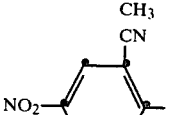 | 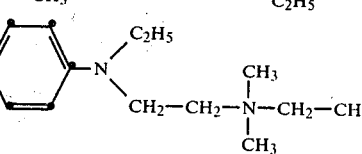 | 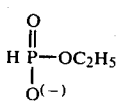 | strongly bluish-tinged red |
| 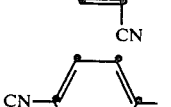 | 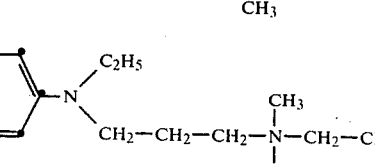 | " | orange |
| 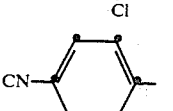 | 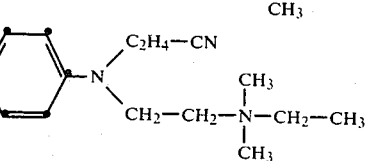 | " | orange |

EXAMPLE 5

A fabric made of polyacrylonitrile is printed with a printing paste which was prepared in the following way: 330 parts by weight of hot water are poured over 30 parts by weight of the dyestuff described in Example 1, 50 parts by weight of thiodiethylene glycol, 30 parts by weight of cyclohexanol and 30 parts by weight of 30% strength acetic acid and the resulting solution is added to 500 parts by weight of crystal gum (gum arabic as a thickener). Finally, 30 parts by weight of zinc nitrate solution are also added. The resulting print is dried, steamed for 30 minutes and then rinsed.

A blue print with very good fastness properties is obtained.

EXAMPLE 6

Using a liquor ratio of 1:40, acid-modified polyglycol terephthalate fibres are introduced, at 20° C., into an aqueous bath which contains, per liter, 3 to 10 g of sodium sulphate, 0.1 to 1 g of oleyl polyglycol ether (50 mols of ethylene oxide), 0-15 g of dimethylbenzyl-dodecylammonium chloride and 0.15 g of the dyestuff described in Example 1 and the pH of which has been adjusted to 4 to 5 with acetic acid. The bath is heated to 100° C. in the course of 30 minutes and is kept at this temperature for 60 minutes. The fibres are then rinsed and dried.

A blue dyeing with very good fastness properties is obtained.

Similarly good results are obtained using the dyestuffs mentioned in the tables for Example 1 and for Examples 2 to 6.

EXAMPLE 7

Using a liquor ratio of 1:40, polyacrylonitrile fibres are introduced, at 40° C., into an aqueous bath which contains, per liter, 0.75 g of 30% strength acetic acid, 0.38 g of sodium acetate and 0.15 g of the dyestuff described in Example 1. The bath is heated to the boil in the course of 20–30 minutes and kept at this temperature for 30–60 minutes. After rinsing and drying, a blue dyeing with very good fastness properties is obtained.

EXAMPLE 8

A stock solution is prepared from 15 parts by weight of the dyestuff mentioned in Example 1, 15 parts by weight of polyacrylonitrile and 70 parts by weight of dimethylformamide and this solution is added to a conventional spinning solution of polyacrylonitrile and spinning is carried out in a known manner.

A blue dyeing with very good fastness properties is obtained.

EXAMPLE 9

Using a liquor ratio of 1:40, acid-modified synthetic polyamide fibres are introduced, at 40° C., into an aqueous bath which contains, per liter, 10 g of sodium acetate, 1 to 5 g of oleyl polyglycol ether (50 mols of ethylene oxide) and 0.3 g of the dyestuff described in Example 1 and the pH of which has been adjusted to 4–5 with acetic acid. The bath is heated to 98° C. in the course of 30 minutes and is kept at this temperature. The fibres are then rinsed and dried. A blue dyeing is obtained.

We claim:

1. Cationic dyestuff of the formula

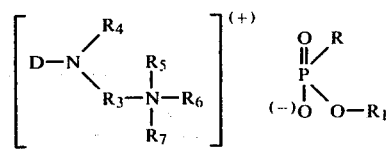

wherein

D denotes the radical of an azo dyestuff which is free from sulphonic acid groups;

R denotes hydrogen; or alkyl with 1–4 carbon atoms unsubstituted or substituted by hydroxyl, cyano, or alkylcarbonyloxy or alkoxycarbonyl with, in each case, 1–4 carbon atoms in the alkyl chain;

$R_1$ denotes alkyl with 1–4 carbon atoms;

$R_3$ is $C_2$–$C_5$-alkylene;

$R_4$ is hydrogen, $C_1$–$C_6$-alkyl, or substituted $C_1$–$C_6$-alkyl where the substituents are halogen, cyano, hydroxyl, $C_1$–$C_4$-alkoxy, $C_1$–$C_4$-alkoxycarbonyl, or $C_1$–$C_4$-alkylcarbonyloxy;

$R_5$ and $R_6$ are $C_1$–$C_6$-alkyl, halo-$C_1$–$C_6$-alkyl, cyano-$C_1$–$C_6$-alkyl, hydroxy-$C_1$–$C_6$-alkyl, $C_1$–$C_4$-alkoxy-$C_1$–$C_6$-alkyl, $C_1$–$C_4$-alkoxycarbonyl-$C_1$–$C_6$-alkyl, $C_1$–$C_4$-alkylcarbonyloxy-$C_1$–$C_6$-alkyl, $C_2$–$C_4$-alkenyl, benzyl, 2-phenethyl, halobenzyl, nitrobenzyl, $C_1$–$C_4$-alkylbenzyl, $C_1$–$C_4$-alkoxybenzyl, halo-2-phenethyl, nitro-2-phenethyl, $C_1$–$C_4$-alkyl-2-phenethyl, or $C_1$–$C_4$-alkoxy-2-phenethyl;

$R_5$ and $R_6$, additionally, when joined together are piperidino, morpholino, $C_1$–$C_4$-alkyl-piperidino, or $C_1$–$C_4$-alkylmorpholino;

$R_4$ and $R_5$, additionally, when joined together are piperazine unsubstituted or substituted with $C_1$–$C_4$-alkyl; and $R_7$ denotes alkyl with 1–4 carbon atoms.

2. Cationic dyestuff of claim 1 of the formula

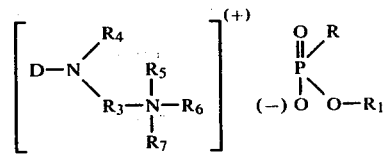

wherein

D is the radical of an azo dyestuff which is free from sulfonic acid groups;

$R_3$ is $C_2$–$C_5$-alkylene, $R_4$ is hydrogen, $C_1$–$C_6$-alkyl, or substituted $C_1$–$C_6$-alkyl where the substituents are halogen, cyano, hydroxyl, $C_1$–$C_4$-alkoxy, $C_1$–$C_4$-alkoxycarbonyl, or $C_1$–$C_4$-alkylcarbonyloxy;

$R_5$ and $R_6$ are $C_1$–$C_6$-alkyl, halo-$C_1$–$C_6$-alkyl, cyano-$C_1$–$C_6$-alkyl, hydroxy-$C_1$–$C_6$-alkyl, $C_1$–$C_4$-alkoxy-$C_1$–$C_6$-alkyl, $C_1$–$C_4$-alkoxycarbonyl-$C_1$–$C_6$-alkyl, $C_1$–$C_4$-alkylcarbonyloxy-$C_1$–$C_6$-alkyl, $C_2$–$C_4$-alkenyl, benzyl, 2-phenethyl, halobenzyl, nitrobenzyl, $C_1$–$C_4$-alkylbenzyl, $C_1$–$C_4$-alkoxybenzyl, halo-2-phenethyl, nitro-2-phenethyl, $C_1$–$C_4$-alkyl-2-phenethyl, or $C_1$–$C_4$-alkoxy-2-phenethyl; $R_5$ and $R_6$, additionally, when joined together are piperidino, morpholino, $C_1$–$C_4$-alkyl-piperidino, or $C_1$–$C_4$-alkylmorpholino; and R, $R_1$, and $R_7$ are the same as in claim 1.

3. A cationic dyestuff according to claim 1 of the formula

4. Cationic dyestuff of the formula

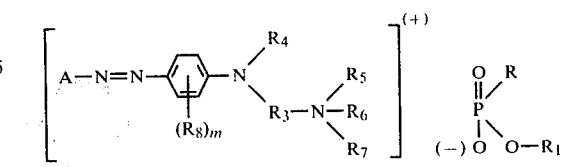

wherein
  A is the radical of an aromatic-carbocyclic diazo component;
  R is hydrogen, $C_1$–$C_4$-alkyl, or $C_1$–$C_4$-alkyl substituted by hydroxy, cyano, $C_1$–$C_4$-alkylcarbonyloxy, or $C_1$–$C_4$-alkoxycarbonyl;
  $R_1$ is $C_1$–$C_4$-alkyl;
  $R_3$ is $C_2$–$C_5$-alkylene;
  $R_4$ is hydrogen or $C_1$–$C_6$-alkyl;
  $R_5$ and $R_6$ are $C_1$–$C_6$-alkyl, $C_2$–$C_4$-alkenyl, benzyl, 2-phenethyl, fluorobenzyl, chlorobenzyl, bromobenzyl, nitrobenzyl, $C_1$–$C_4$-alkylbenzyl, $C_1$–$C_4$-alkoxybenzyl, fluoro-2-phenethyl, chloro-2-phenethyl, bromo-2-phenethyl, nitro-2-phenethyl, $C_1$–$C_4$-alkyl-2-phenethyl, $C_1$–$C_4$-alkoxy-2-phenethyl, or $C_1$–$C_6$-alkyl substituted by fluoro, chloro, bromo, cyano, hydroxy, $C_1$–$C_4$-alkoxy, $C_1$–$C_4$-alkoxycarbonyl, or $C_1$–$C_4$-alkylcarbonyloxy;
  $R_7$ is $C_1$–$C_4$-alkyl,
  $R_8$ is fluoro, chloro, bromo, $C_1$–$C_6$-alkyl, fluoro-$C_1$–$C_6$-alkyl, chloro-$C_1$–$C_6$-alkyl, bromo-$C_1$–$C_6$-alkyl, cyano-$C_1$–$C_6$-alkyl, hydroxy-$C_1$–$C_6$-alkyl, $C_1$–$C_4$-alkoxy-$C_1$–$C_6$-alkyl, $C_1$–$C_4$-alkoxycarbonyl-$C_1$–$C_6$-alkyl, $C_1$–$C_4$-alkylcarbonyloxy-$C_1$–$C_6$-alkyl, $C_1$–$C_6$-alkoxy, phenyloxy, naphthyloxy, fluorophenoxy, floronaphthyloxy, chlorophenoxy, chloronaphthyloxy, bromophenoxy, bromonaphthyloxy, nitrophenoxy, nitronaphthyloxy, $C_1$–$C_4$-alkylphenoxy, $C_1$–$C_4$-alkylnaphthyloxy, $C_1$–$C_4$-alkoxyphenoxy, $C_1$–$C_4$-alkoxynaphthyloxy, $C_1$–$C_4$-alkylcarbonyl, $C_1$–$C_4$-alkylsulphonyl, benzoyl, $C_1$–$C_4$-alkylcarbonylamino, $C_1$–$C_4$-alkylsulphonylamino, or benzoylamino, and
  m is 0, 1, 2, 3, or 4.

5. Cationic dyestuff of claim 1 wherein
  A is phenyl or phenyl substituted by $C_1$–$C_4$-alkyl, fluoro, chloro, bromo, cyano, nitro, $C_1$–$C_4$-alkoxycarbonyl, $C_1$–$C_4$-alkylcarbonyloxy, $C_1$–$C_4$-alkylcarbonyl, $C_1$–$C_4$-alkylaminosulphonyl, $C_1$–$C_4$-alkylaminocarbonyl, di($C_1$–$C_4$-alkyl) aminosulphonyl, or di($C_1$–$C_4$-alkyl) aminocarbonyl.

6. A cationic dyestuff of the formula

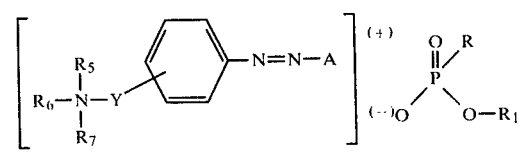

wherein
  the benzene is unsubstituted or substituted by nonionic radicals,
  Y denotes a direct bond or —$CH_2$—CO— and
  A denotes a coupling component of the benzene, naphthalene, indole, pyrazolone or aminopyrazole series and

---

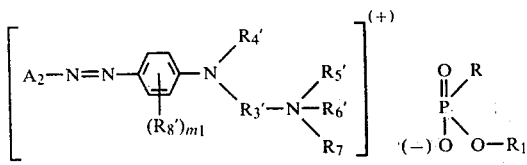

wherein
  $A_2$ denotes a radical of the formula

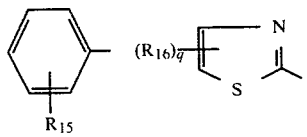

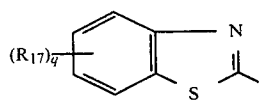

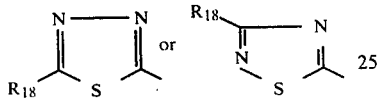

wherein
  $R_{15}$ denotes $C_1$–$C_4$-alkyl, halogen, cyano, nitro, $C_1$–$C_4$-alkoxycarbonyl, $C_1$–$C_4$-alkylcarbonyloxy, $C_1$–$C_4$-alkylcarbonyl or optionally $C_1$–$C_4$-monoalkylated or -dialkylated aminosulphonyl or aminocarbonyl,
  n denotes 1 to 5,
  $R_{16}$ denotes $C_1$–$C_4$-alkyl, phenyl, cyano, nitro or $C_1$–$C_4$-alkoxycarbonyl,
  $R_{17}$ denotes $C_1$–$C_4$-alkyl, $C_1$–$C_4$-alkoxy, phenoxy, nitro, $C_1$–$C_4$-alkylcarbonyloxy or halogen,
  $R_{18}$ denotes hydrogen, $C_1$–$C_4$-alkyl, $C_1$–$C_4$-alkoxy, phenoxy, cyclohexyl, phenyl, phenyl which is substituted by $C_1$–$C_4$-alkyl, $C_1$–$C_4$-alkoxy, nitro, halogen or acetylamino, benzyl, methyl-, ethyl- or phenylmercapto, benzylmercapto, dimethylamino or diethylamino or methyl-, ethyl- or phenyl-sulphonyl, and
  q denotes 0, 1 or 2,
  $R'_3$ denotes alkylene with 2–5 C-atoms,
  $R'_4$ denotes hydrogen or alkyl with 1–6 C-atoms, which are unsubstituted or substituted by halogen, cyano, hydroxyl,
  $C_1$–$C_4$-alkoxy, $C_1$–$C_4$-alkoxycarbonyl or $C_1$–$C_4$-alkylcarbonyloxy,
  $R'_5$ and $R'_6$ denote alkyl with 1–6 C-atoms, which are unsubstituted or substituted by halogen, cyano, hydroxyl,
  $C_1$–$C_4$-alkoxy, $C_1$–$C_4$-alkoxycarbonyl or $C_1$–$C_4$-alkylcarbonyloxy; alkenyl with 2–4 C-atoms; benzyl or 2-phenylethyl which can be substituted in the ring by halogen, nitro,
  $C_1$–$C_4$-alkyl or $C_1$–$C_4$-alkoxy; or $R'_5$ and $R'_6$ conjointly form piperidine or morpholine, which can be substituted by alkyl with 1–4 C-atoms,
  $R'_8$ denotes halogen, alkyl with 1–6 C-atoms, alkoxy with 1–4 C-atoms, phenyloxy, alkylcarbonyl or -sulphonyl with 1–4 C-atoms, benzoyl, alkylcarbonyl- or -sulphonylamino with 1–4 C-atoms,
  $m_1$ denotes 0, 1 or 2 and
  R, $R_1$ and $R_7$ have the meaning of claim 1.

the radicals R, R₁, R₅, R₆ and R₇ have the meaning indicated in claim 1.
7. Cationic dyestuff according to claim 1 of the formula
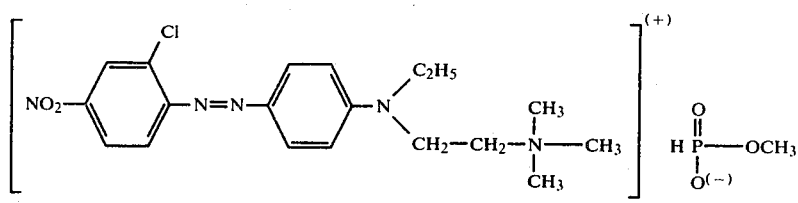
* * * * *

UNITED STATES PATENT AND TRADEMARK OFFICE
CERTIFICATE OF CORRECTION

PATENT NO. : 4,246,172
DATED : January 20, 1981
INVENTOR(S) : Günther Boehmke et al It is certified that error appears in the above-identified patent and that said Letters Patent are hereby corrected as shown below:

Change title to read -- ORGANOPHOSPHONIC ACID SALTS OR QUATERNARY AMMONIUM ALKYLENE AMINO AZO DYES --.

Column 7, line 32, after "about" insert -- 1 g/l --.

Signed and Sealed this

Twenty-fourth Day of November 1981

[SEAL]

Attest:

GERALD J. MOSSINGHOFF

Attesting Officer     Commissioner of Patents and Trademarks